US009490958B2

(12) United States Patent
Laselva et al.

(10) Patent No.: US 9,490,958 B2
(45) Date of Patent: *Nov. 8, 2016

(54) ALLOCATING RESOURCES WITHIN A COMMUNICATION SYSTEM

(71) Applicant: Nokia Solutions and Networks Oy, Espoo (FI)

(72) Inventors: Daniela Laselva, Klarup (DK); Jeroen Wigard, Klarup (DK)

(73) Assignee: Nokia Solutions and Networks Oy, Espoo (FI)

( * ) Notice: Subject to any disclaimer, the term of this patent is extended or adjusted under 35 U.S.C. 154(b) by 233 days.

This patent is subject to a terminal disclaimer.

(21) Appl. No.: 14/193,516

(22) Filed: Feb. 28, 2014

(65) Prior Publication Data

US 2014/0177574 A1    Jun. 26, 2014

Related U.S. Application Data

(63) Continuation of application No. 12/994,964, filed as application No. PCT/EP2008/056720 on May 30, 2008, now Pat. No. 8,687,573.

(51) Int. Cl.
*H04L 5/00* (2006.01)
*H04W 72/04* (2009.01)
*H04W 72/10* (2009.01)

(52) U.S. Cl.
CPC ............ *H04L 5/0058* (2013.01); *H04W 72/10* (2013.01)

(58) Field of Classification Search
None
See application file for complete search history.

(56) References Cited

U.S. PATENT DOCUMENTS

| | | | |
|---|---|---|---|
| 7,336,956 B2* | 2/2008 | Halonen | H04W 72/082 455/450 |
| 7,729,244 B2 | 6/2010 | Sadr | 370/230 |
| 8,010,122 B2 | 8/2011 | Liu et al. | 455/452.1 |
| 8,213,422 B2* | 7/2012 | Casey | H04L 12/5695 370/389 |
| 2002/0110106 A1 | 8/2002 | Koo et al. | |
| 2003/0050990 A1* | 3/2003 | Craddock | H04L 29/06 709/212 |
| 2003/0179769 A1 | 9/2003 | Shi et al. | 370/442 |
| 2004/0009770 A1 | 1/2004 | Sivanandan et al. | 455/425 |
| 2004/0125800 A1 | 7/2004 | Zellner | |
| 2004/0185860 A1 | 9/2004 | Marjelund et al. | 455/450 |
| 2006/0009226 A1* | 1/2006 | Vicharelli | H04W 16/18 455/450 |
| 2007/0002750 A1 | 1/2007 | Sang et al. | |
| 2007/0043558 A1 | 2/2007 | Schwarz et al. | |
| 2007/0115896 A1 | 5/2007 | To et al. | |
| 2007/0258433 A1 | 11/2007 | Speight | 370/349 |
| 2008/0019305 A1 | 1/2008 | Dekorsy et al. | |
| 2008/0020775 A1 | 1/2008 | Willars | 455/445 |
| 2008/0170499 A1 | 7/2008 | Cozens et al. | 370/230.1 |
| 2009/0046642 A1 | 2/2009 | Damnjanovic | 370/329 |
| 2009/0052384 A1* | 2/2009 | Zisimopoulous | H04L 47/14 370/329 |
| 2009/0086705 A1* | 4/2009 | Zisimopoulos | H04W 72/1268 370/347 |

\* cited by examiner

FOREIGN PATENT DOCUMENTS

| | | |
|---|---|---|
| CN | 1914943 A | 2/2007 |
| WO | WO-99/52307 A1 | 10/1999 |
| WO | WO-2006/071155 A1 | 7/2006 |

*Primary Examiner* — Candal Elpenord
(74) *Attorney, Agent, or Firm* — Harrington & Smith

(57) ABSTRACT

The present invention is related to a method for allocating resources in a communications system. The method comprises receiving a matrix of priorities assigned to a plurality of services at a plurality of user levels; and allocating resources to a bearer for a station of the communication system based at least in part upon the priority assigned to a service provided over the bearer at the user level associated with a subscriber.

28 Claims, 4 Drawing Sheets

| | GOLD | SILVER | BRONZE |
|---|---|---|---|
| Voice over IP | 1 | 2 | 4 |
| Streaming | 3 | 4 | 6 |
| Internet Browsing | 5 | 7 | 8 |
| Gaming | 9 | 10 | 11 |
| P2P | 15 | 15 | 15 |

Figure 2

ALLOCATING RESOURCES WITHIN A COMMUNICATION SYSTEM

CROSS-REFERENCE TO RELATED APPLICATIONS

This application is a continuation of U.S. patent application Ser. No. 12/994,964, which is the National Stage of International Application No. PCT/EP2008/056720, filed May 30, 2008.

FIELD OF THE INVENTION

The present invention is related to allocating resources for bearers in a communications system.

BACKGROUND

A communication system is a facility which facilitates communication between two or more entities such as communication devices, network entities and other nodes. A communication system may be provided by one or more interconnected networks and the elements thereof and a plurality of communication devices, for example user devices. One or more gateway nodes may be provided for interconnecting various networks. For example, a gateway node can be provided between an access network and other communication networks. The communication may comprise, for example, communication of data for carrying communications such as voice, electronic mail (email), text message, multimedia and so on.

A communication system typically operates in accordance with a standard and/or a set of specifications and protocols which set out what the various elements of the system are permitted to do and how that should be achieved. For example, it is typically defined if the user, or more precisely a user device, is provided with a circuit switched bearer or a packet switched bearer, or both. Also, the manner in which user communication devices can access a communication system is typically defined, as is the manner in which communications should be implemented between the user device and various elements of the communication system. The functions and responsibilities of various entities are also typically defined by communication protocols.

A user may communicate via a communication system and access various applications by means of an appropriate communication device. The user communication devices are often referred to as user equipment (UE). An appropriate access system allows the communication device to communicate via the communication system. An access to the communications system may be provided by means of a fixed line or wireless communication interface, or a combination of these. Examples of wireless systems include cellular networks, various wireless local area networks (WLANs), wireless personal area networks (WPANs), satellite based communication systems and various combinations of these.

In wireless systems a network entity such as a base station provides an access node for communication devices. Typically the operation of a base station node and other apparatus of an access system required for the communication is controlled by an appropriate control entity. The control entity can be interconnected with other control entities of the communication network.

It has been proposed that control functions that have been handled in conventional network by a centralised controller can also be handled in a distributed manner. This kind of distributed architecture is sometimes referred to as a "flat architecture". A non-limiting example of the flat architectures is a concept known as the Evolved Universal Terrestrial Radio Access (E-UTRA), also known as the long term evolution (LTE). An Evolved Universal Terrestrial Radio Access Network (E-UTRAN) consists of E-UTRAN Node Bs (eNBs) which are configured to provide base station and control functionalities of the radio access network. The eNBs may provide E-UTRA features such as user plane radio link control/medium access control/physical layer protocol (RLC/MAC/PHY) and control plane radio resource control (RRC) protocol terminations towards the mobile devices. The eNBs interface to an E-UTRAN access gateway (aGW) via a so called S1 interface, and are interconnected via a so called X2 interface.

The Long Term Evolution (LTE) can provide several means for Quality of Service (QoS) control and differentiation. For example, each evolved packet system (EPS) bearer may be associated with the following parameters:

QoS Class identifier (QCI); A QCI is a scalar that is used as a reference to access node-specific parameters that control bearer level packet forwarding treatment (e.g. scheduling weights, admission thresholds, queue management thresholds, link layer protocol configuration, etc.), and that have been pre-configured by the operator owning the access node (e.g. eNodeB). On the radio interface and on S1, each PDU (e.g. RLC PDU or GTP-u PDU) is indirectly associated with one QCI via the bearer identifier carried in the PDU header.

Allocation and Retention Priority (ARP). The primary purpose of ARP is to decide whether a bearer establishment/modification request can be accepted or needs to be rejected in case of resource limitations (typically available radio capacity in case of GBR bearers). In addition, the ARP can be used (e.g. by the eNodeB) to decide which bearer(s) to drop during exceptional resource limitations (e.g. at handover). Once successfully established, a bearer's ARP shall not have any impact on the bearer level packet forwarding treatment (e.g. scheduling and rate control). Such packet forwarding treatment should be solely determined by the other bearer level QoS parameters: QCI, GBR, MBR, and AMBR.

Each GBR bearer may additionally be associated with the following bearer level QoS parameters:

Guaranteed Bit Rate (GBR); The GBR denotes the bit rate that can be expected to be provided by a GBR bearer.

Maximum Bit Rate (MBR); The MBR limits the bit rate that can be expected to be provided by a GBR bearer (e.g. excess traffic may get discarded by a rate shaping function). The MBR may be greater than or equal to GBR for a particular GBR bearer.

Furthermore, each PDN connection (i.e. IP address) may be associated with the following IP-CAN session level QoS parameter:

Aggregate Maximum Bit Rate (AMBR); Multiple EPS bearers of the same PDN connection can share the same AMBR. That is, each of those EPS bearers could potentially utilize the entire AMBR, e.g. when the other EPS bearers do not carry any traffic. The AMBR limits the aggregate bit rate that can be expected to be provided by the EPS bearers sharing the AMBR (e.g. excess traffic may get discarded by a rate shaping function). AMBR applies to all Non-GBR bearers belonging to the same PDN connection. GBR bearers are outside the scope of AMBR.

The GBR and MBR denote bit rates of traffic per bearer while AMBR denotes a bit rate of traffic per group of bearers. Each of those three bearer level QoS parameters has an uplink and a downlink component.

On top of the above mentioned QoS attributes in 3GPP also a prioritized bit rate (PBR) in the uplink is specified. PBR denotes the minimum bit rate for a bearer, such that the UE upon receiving an allocation for data transmission does the following:

Serve the bearers with their PBR in priority order;
If there is excess capacity left in the allocation, fill the excess capacity with traffic beyond the PBR but below the MBR per bearer in priority order.

One 'EPS subscribed QoS profile' is defined for each APN permitted for the subscriber. It contains the bearer level QoS parameter values for that APN's default bearer (QCI and ARP) and that APN's AMBR.

In the eNB packet scheduling and admission control traffic is treated according to their QoS parameters in order to optimise the cell throughput and user satisfaction.

Existing systems describe how service differentiation may be implemented to ensure that services such as voice are prioritised over browsing. For example, US 2007/0002750 describes a system for scheduling packets in a wireless communication system where there are real-time users and non-real-time users.

There is a desire for both user differentiation and service differentiation so that operators may offer different levels of subscriptions.

It is an aim of the embodiments to provide a system which can allocate resources based upon priorities for services at different user levels, or at least provide a useful alternative.

SUMMARY

According to an embodiment there is provided a method of allocating resources in a communications system, comprising:

receiving a matrix of priorities assigned to a plurality of services at a plurality of user levels; and
allocating resources to a bearer for a station of the communication system based at least in part upon the priority assigned to the service provided over the bearer at the user level associated with a subscriber.

The subscriber may be associated with the station. The station may be a user equipment.

The communications system may be a cellular system.

The allocation of resources may determine a bit rate provided for the bearer.

The resources may include time, power, codes, frequencies.

At least one service may include a guaranteed bit rate (GBR) and, in the step of allocating resources, the resources may be allocated to provide the guaranteed bit rate for the bearers over which that service is provided.

At least one service may include a maximum bit rate (MBR) and when the resources have been allocated for all bearers, the surplus resources may be allocated up to the maximum bit rate for the bearers over which that service is provided.

At least one service may include a prioritised bit rate (PBR) and, in the step of allocating resources, the resources may be allocated to provide the prioritised bit rate for the bearers over which that service is provided At least one service may include an aggregate maximum bit rate (AMBR) and when the resources have been allocated for all bearers, the surplus resources may be allocated up to the aggregate maximum bit rate for all bearers over which that service is provided.

The GBR may be defined for the bearer in either the uplink direction, the downlink direction, or both the uplink and downlink directions. The PBR may be defined for the bearer in either the uplink direction, the downlink direction, or both the uplink and downlink directions.

The service provided over the bearer may be ascertained by a gateway of the communications system.

The step of allocating the resources may be performed by a Radio Resource Management (RRM) network element of the communications system.

The resources may be allocated adaptively.

The user levels may be ranked from high value to low value.

The service may be defined by a quality control indication (QCI) of the bearer.

The user level may be defined by an allocation and retention priority (ARP) of the bearer.

According to a further embodiment there is provided an apparatus, comprising:

a receiving unit configured for receiving a matrix of priorities assigned to a plurality of services at a plurality of user levels; and
an allocating unit configured for allocating resources to a bearer for a station of a communication system based at least in part upon the priority assigned to a service provided over the bearer at the user level associated with a subscriber.

BRIEF DESCRIPTION OF THE DRAWINGS

Embodiments of the invention will now be described, by way of example only, with reference to the accompanying drawings in which:

FIG. 2: shows a table of priorities for different services at different user levels;

DESCRIPTION OF CERTAIN EMBODIMENTS

In the following embodiments resources are allocated in a communication system based on a matrix of priorities for different services at different user levels. The matrix is received and used to allocate resources to bearers for stations in accordance with priority associated with the service provided over the bearer at the user level of the subscriber of the station.

An embodiment of the present invention will now be described with reference to an Evolved Universal Terrestrial Radio Access Network (E-UTRAN). However, it will be appreciated that with appropriate modifications the invention may be used in other networks.

Figure 1:
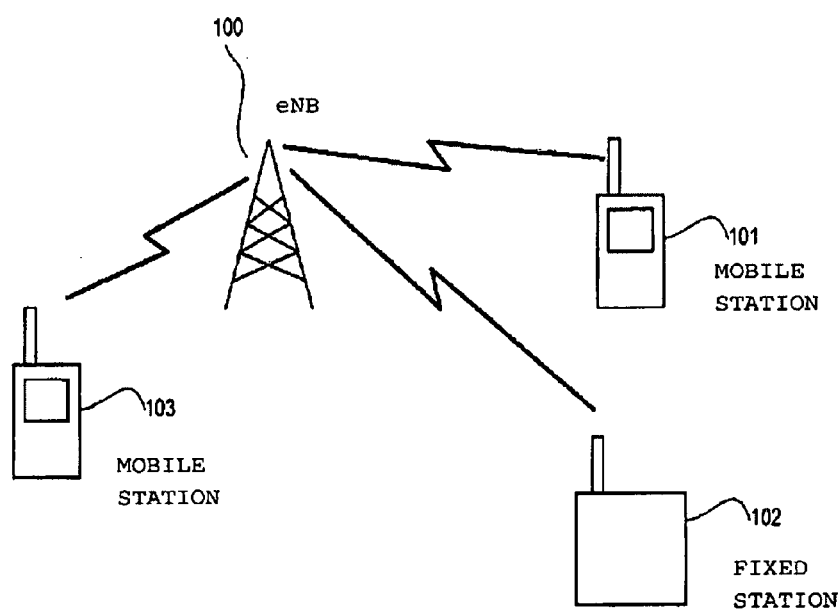
FIG. 1: shows a schematic diagram illustrating a cellular communication system.

FIG. 1 shows an Enhanced Node B (eNB) 100 and a number of stations of a cellular communication system. The eNB may include one or more base stations, a gateway, and a Radio Resource Management (RRM) module.

Mobile station 101 is using a voice service over a first bearer and a browsing service over a second bearer.

Fixed station 102 is using a peer to peer service over a first bearer.

Mobile station 103 is using a voice service over a first bearer and a streaming service over a second bearer.

Each of the stations may be associated with one or more subscribers. The bearers being provided to the stations may be associated with one of the subscribers associated with the station.

In an embodiment of the invention, the subscribers may be associated with different user levels. The user levels may enable differentiation between different groups of subscribers. For example, it may be desirable to prioritise communications of a group, if the group relates to valued subscribers.

In the embodiment shown in FIG. 1 single subscribers are associated with each station. Furthermore, the subscriber of mobile station 101 is a gold level user, the subscriber of fixed station 102 is a silver level user, and the subscriber of mobile station 103 is a bronze level user.

The different user levels may indicate subscriber value from highest—gold, to lowest—bronze.

The Radio Resource Management (RRM) network element of the Enhanced Node B may receive a matrix as shown in FIG. 2.

The matrix may be formed of a plurality of services against a plurality of user levels. Each service at each user level may be assigned to a priority.

The matrix may be generated by another network element of the communications system.

For example, in the matrix 200 shown in FIG. 2, there are three user levels 201—Gold, Silver and Bronze. In addition, there are five different services 202—Voice over IP, Streaming, Internet browsing, Gaming, and Peer to Peer (P2P).

In the matrix shown, user level Silver 203 is allocated a priority of four 204 for Streaming 205.

The matrix may be received from a central server within the communication system or may be received from a memory unit at the RRM module.

The RRM determines the service and user levels associated with the bearers currently in use by stations of the communications system and then allocates resources for the bearers based, at least in part, upon the matrix.

In one embodiment, the QCI parameter may be used for determining the service and ARP parameter may be used for determining the user level. However, it will be appreciated that specifications for radio networks change and that different parameters may be used to define the service or user level. For example, a specific user level parameter may be introduced into a new version of the 3GPP specification, in which case, the RRM may determine the user level from the specific user level parameter associated with the bearer.

It will be appreciated that a different network element of the communications system may be adapted to receive the matrix and allocate the resources.

The QCI parameter may be determined for a bearer by the gateway. The gateway may assign the QCI parameter by analysing the traffic that is being carried by the bearer.

In one embodiment, the RRM may allocate resources for the bearers adaptively rather than when the bearer is first requested. This may be beneficial because radio conditions generally change dynamically. For example, new bearers may be allocated which may necessitate reallocation of resources to existing bearers.

For example, considering FIG. 1 and FIG. 2, resources may be first allocated to the bearer which is being used for voice service by mobile station A, then to the bearer being used for browsing service by mobile station A, then the bearer which is being used for voice service by mobile station C, then bearer which is being used for streaming service by mobile station C, and then bearer which is being used for P2P service by fixed station B.

The resources may include time, power, codes, or frequencies.

The resources allocated may affect the bit rate which is being provided.

Each service may be associated with a guaranteed bit rate (GBR). The bearer providing the service will then include a definition of the GBR for that service. In some embodiments, the service may be associated with a prioritised bit rate (PBR).

The resources may be allocated to ensure the bit rate is provided up to a guaranteed bit rate (GBR) or prioritised bit rate (PBR) for the bearer.

The GBR and/or PBR may be defined for and provided for both the bearer in both the uplink and downlink direction. The RRM may be used to allocate resources in both the uplink and downlink directions or only for one direction.

Once the bearers have been allocated resources to ensure their bit rate at the levels of GBR and PBR, there may be excess bit rate.

Resources may then be allocated to the services for the stations in accordance with the priority in the matrix to provide up to the maximum bit rate (MBR) for the bearer or up to the aggregate maximum bit rate (AMBR). Aggregate maximum bit rate is where multiple bearers share the total allocated bit rate.

Figure 3:
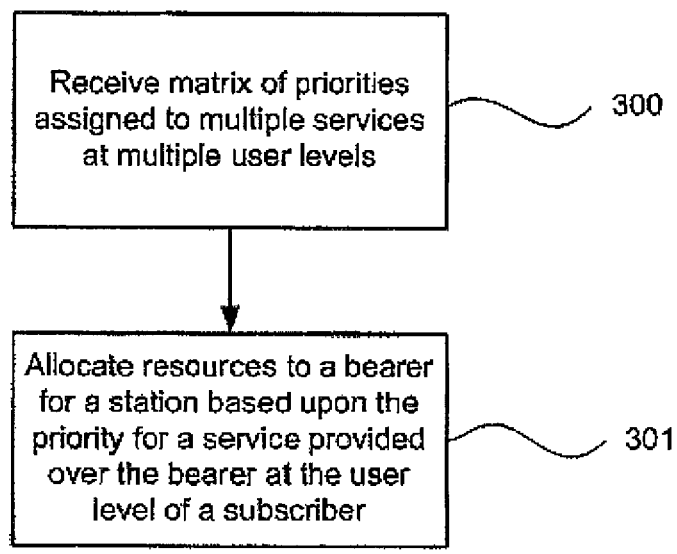
FIG. 3: shows a diagram illustrating a method of an embodiment of the invention.

A method of an embodiment of the invention is shown in FIG. 3.

In step 300, a matrix is received—the matrix comprises priorities assigned to a plurality of services at a plurality of user levels.

In step 301, resources are allocated to a service for a station of the communication system based at least in part upon the priority assigned to that service at the user level associated with a subscriber.

Figure 4:
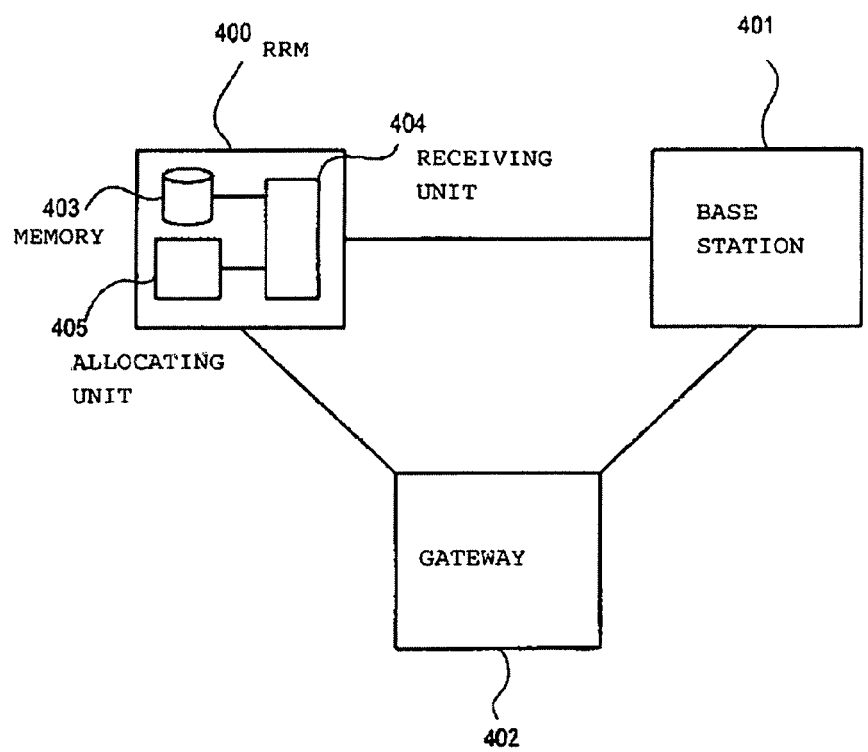
FIG. 4: shows a diagram illustrating an implementation of an embodiment of the invention.

An implementation of an embodiment of the invention is shown in FIG. 4.

A Radio Resource Management (RRM) network element 400 is shown. Also shown are a base station 401 and a gateway 402.

In the embodiment shown, the invention is implemented within the RRM 400. The RRM 400 may include a memory 403 (or other storage means) for storing a matrix. The matrix may include priorities associated with a plurality of services at a plurality of user levels.

The RRM may also include a receiving unit 404 (or other receiving means) for receiving the matrix either from the memory 403, from another network element in the communications system or from another element. The RRM may also include an allocating unit 405 (or other allocating means) for allocating resources to bearers of stations in accordance with the priority associated with the service provided over the bearer at the user level of the subscriber of the station.

A potential advantage of embodiments of the present invention is that resource allocation may be differentiated on the basis of user levels and service type rather than solely service type. This enables operators of communications systems to offer to subscribers a range of different user levels which may be offered at a range of different pricing levels.

The required data processing functions may be provided by means of one or more data processors. Apart from the user device, a part of the data processing may be provided in a central processing unit of an access system, or distributed across several data processing modules. The data processing functions at the user equipment side may be provided by separate processors, or by an integrated processor. An appropriately adapted computer program code product or products may be used for implementing the embodiments, when loaded on an appropriate processor, for example in a processor of the mobile device and/or an access system controller. The program code product for providing the operation may be stored on and provided by means of a carrier medium such as a carrier solid-state memory chip, disc, card or tape. A possibility is to download the program code product to a base station and/or mobile device via a data network.

It is noted that whilst embodiments have been described in relation to user equipment such as mobile terminals, embodiments of the present invention are applicable to any other type of apparatus suitable for communication via an access node. The wireless interfaces may even be based on different access technologies. A mobile device may be configured to enable use of different access technologies, for example, based on an appropriate multi-radio implementation.

It is also noted that although certain embodiments were described above by way of example with reference to the exemplifying architectures, embodiments may be applied to any other suitable forms of communication systems than those illustrated and described herein. It is also noted that the term access interface is understood to refer to any interface an apparatus configured for wireless communication may use for accessing applications.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details representative apparatus and method, and illustrative examples shown and described. Accordingly, departures may be made from such details without departure from the spirit or scope of applicant's general inventive concept.

The invention claimed is:

1. A method comprising:
receiving a matrix of priorities in a network element of a communications system, each priority in said matrix being assigned to one of a plurality of services for one of a plurality of user subscriber levels, said user subscriber levels being associated with corresponding pricing levels, wherein said user subscriber levels differentiate among groups of subscribers for priority in the provision of services; and
allocating resources to a bearer for a station of the communication system based at least in part upon the priority assigned to a service provided over the bearer at the user subscriber level associated with a subscriber, wherein the bearer is configured according to the allocation of resources.

2. The method as claimed in claim 1, wherein the subscriber is associated with the station.

3. The method as claimed in claim 1, wherein allocating resources includes setting a bit rate provided for the bearer.

4. The method as claimed in claim 1, wherein the resources include time, power, codes, or frequencies.

5. The method as claimed in claim 3, wherein at least one service includes at least one of a guaranteed bit rate (GBR) and a prioritized bit rate (PBR) and, in the step of allocating resources, the resources are allocated to provide the guaranteed bit rate for the bearer over which that service is provided.

6. The method as claimed in claim 3, wherein at least one service includes at least one of a maximum bit rate (MBR) and a prioritized bit rate (PBR) and, when the resources have been allocated for all bearers, surplus resources are allocated up to the maximum bit rate for the bearer over which that service is provided.

7. The method as claimed in claim 5, wherein at least one of the GBR and the PBR is for the bearer in one of the uplink direction, the downlink direction, or both the uplink and downlink directions.

8. The method as claimed in claim 1, wherein the service provided over the bearer is ascertained by a gateway of the communications system.

9. The method as claimed in claim 1, wherein the step of allocating the resources is performed by a Radio Resource Management (RRM) network element of the communications system.

10. The method as claimed in claim 1, wherein the resources are allocated adaptively.

11. The method as claimed in claim 1, wherein the user subscriber levels are ranked from high value to low value.

12. The method as claimed in claim 1, wherein the service is defined by a quality control indication (QCI) of the bearer.

13. The method as claimed in claim 1, wherein the user subscriber level is defined by an allocation and retention priority (ARP) of the bearer.

14. A computer program product stored on a non-transitory computer usable medium, comprising a computer program arranged for effecting the method of claim 1.

15. An apparatus comprising:
one or more processors; and
one or more memories including computer program code, the one or more memories and the computer program code configured, with the one or more processors, to cause the apparatus to perform at least the following:
receiving a matrix of priorities, each priority in said matrix being assigned to one of a plurality of services for one of a plurality of user subscriber levels, said user subscriber levels being associated with corresponding pricing levels, wherein said user subscriber levels differentiate among groups of subscribers for priority in the provision of services; and
allocating resources to a bearer for a station of a communication system based at least in part upon the priority assigned to a service provided over the bearer at the user subscriber level associated with a subscriber, wherein the bearer is configured according to the allocation of resources, and
wherein the apparatus is a network element of a communications system.

16. The apparatus as claimed in claim 15, wherein allocating resources includes setting a bit rate provided for the bearer.

17. The apparatus as claimed in claim 15, wherein the resources include time, power, codes, or frequencies.

18. The apparatus as claimed in claim 16, wherein at least one service includes at least one of a guaranteed bit rate (GBR) and a prioritized bit rate (PBR) and, in the step of allocating resources, the resources are allocated to provide the guaranteed bit rate for the bearer over which that service is provided.

19. The apparatus as claimed in claim 16, wherein at least one service includes at least one of a maximum bit rate (MBR) and an aggregate maximum bit rate (AMBR) and, when the resources have been allocated for all bearers, surplus resources are allocated up to the maximum bit rate for the bearer over which that service is provided.

20. The apparatus as claimed in claim 18, wherein at least one of the GBR and the PBR is for the bearer in one of the uplink direction, the downlink direction, or both the uplink and downlink directions.

21. The apparatus as claimed in claim 15, wherein the service provided over the bearer is ascertained by a gateway of the communications system.

22. The apparatus as claimed in claim 15, wherein the apparatus is part of a Radio Resource Management (RRM) network element of the communications system.

23. The apparatus as claimed in claim 15, wherein the resources are allocated adaptively.

24. The apparatus as claimed in claim 15, wherein the user subscriber levels are ranked from high value to low value.

25. The apparatus as claimed in claim 15, wherein the service is defined by a quality control indication (QCI) of the bearer.

26. The apparatus as claimed in claim 15, wherein the user subscriber level is defined by an allocation and retention priority (ARP) of the bearer.

27. A system comprising:
the apparatus of claim 15;
a plurality of stations, each station associated with at least one subscriber and each subscriber associated with a user subscriber level;
a base station configured to provide bearers to the plurality of stations; and
a gateway configured to determine a service provided over the bearers.

28. A method comprising:
generating a matrix of priorities at a server of a communications system, each priority in said matrix being assigned to one of a plurality of services for one of a plurality of user subscriber levels, said user subscriber levels being associated with corresponding pricing levels, wherein said user subscriber levels differentiate among groups of subscribers for priority in the provision of services; and
transmitting the matrix to a network element of a communications system for use in allocating resources for bearers for stations of the communications system,
wherein the bearers are configured according to the allocation of resources, whereby the resource allocation is differentiated on the basis of user subscriber levels and type of service so that operators of communications systems are able to offer subscribers a range of different user subscriber levels.

* * * * *